United States Patent
Bhashkar et al.

(10) Patent No.: US 10,311,234 B2
(45) Date of Patent: Jun. 4, 2019

(54) ANTI-RANSOMWARE

(71) Applicant: Quick Heal Technologies Private Limited, Pune (IN)

(72) Inventors: Aishwary Bhashkar, Pune (IN);
Abhijit P Kulkarni, Pune (IN);
Prakash D Jagdale, Pune (IN)

(73) Assignee: Quick Heal Technologies Private Limited, Pune, Maharastra (IN)

( * ) Notice: Subject to any disclaimer, the term of this patent is extended or adjusted under 35 U.S.C. 154(b) by 406 days.

(21) Appl. No.: 14/844,011

(22) Filed: Sep. 3, 2015

(65) Prior Publication Data
US 2016/0378988 A1 Dec. 29, 2016

(30) Foreign Application Priority Data

Jun. 26, 2015 (IN) .......................... 2461/MUM/2015

(51) Int. Cl.
*G06F 21/56* (2013.01)
(52) U.S. Cl.
CPC .......... *G06F 21/566* (2013.01); *G06F 21/568* (2013.01); *G06F 2221/034* (2013.01)
(58) Field of Classification Search
CPC . G06F 21/566; G06F 21/568; G06F 2221/034
USPC .......................................................... 726/24
See application file for complete search history.

(56) References Cited

U.S. PATENT DOCUMENTS

| 5,504,892 | A | * | 4/1996 | Atsatt | ............... | G06F 17/30067 |
| | | | | | | 707/822 |
| 8,055,613 | B1 | | 11/2011 | Mu et al. | | |
| 8,326,803 | B1 | | 12/2012 | Stringham | | |
| 8,352,522 | B1 | | 1/2013 | Cheng | | |
| 8,433,863 | B1 | * | 4/2013 | Orcutt | ................. | G06F 11/1458 |
| | | | | | | 707/646 |
| 8,499,349 | B1 | * | 7/2013 | Cruz | ..................... | G06F 21/568 |
| | | | | | | 726/24 |

(Continued)

OTHER PUBLICATIONS

Removing ransomware using the AntiRansomware Tool, Source: http://esupport.trendmicro.com/solution/en-US/1097042.aspx, downloaded circa Jan. 8, 2015, pp. 1-3.

(Continued)

*Primary Examiner* — Kambiz Zand
*Assistant Examiner* — Aubrey H Wyszynski
(74) *Attorney, Agent, or Firm* — IPHorizons PLLC; Narendra Reddy Thappeta

(57) ABSTRACT

According to an aspect of the present disclosure, a digital processing system, in response to identifying multiple files opened with write permission by a process, creates a corresponding backup copy of each of the opened files. The system computes a frequency of opening of the files with write permission by the process, and then determines whether the computed frequency is greater than a threshold. If the frequency is determined to be greater than the threshold, the system provides control to a user to recover any of the files (opened by the process) based on the corresponding backup copy (previously created in response to opening). Thus, the execution of a ransomware in the system may be potentially detected and the associated maladies (such as unavailability of personal data, requirement to make payment for recovering the personal data, etc.) may be avoided.

20 Claims, 4 Drawing Sheets

(56) References Cited

U.S. PATENT DOCUMENTS

| | | |
|---|---|---|
| 8,756,683 B2 | 6/2014 | Manion et al. |
| 2003/0028592 A1* | 2/2003 | Ooho ................. G06F 11/1469 709/203 |
| 2003/0233544 A1* | 12/2003 | Erlingsson .......... G06F 21/6218 713/167 |
| 2005/0182797 A1* | 8/2005 | Adkins ............... G06F 11/1435 |
| 2007/0028063 A1 | 2/2007 | Hars et al. |
| 2007/0100905 A1* | 5/2007 | Masters ................ G06F 21/568 |
| 2010/0070475 A1* | 3/2010 | Chen ................... G06F 11/1451 707/640 |
| 2012/0030731 A1* | 2/2012 | Bhargava ............... G06F 21/54 726/3 |
| 2012/0131318 A1* | 5/2012 | Zhan ................... G06F 11/1417 713/2 |
| 2013/0067576 A1 | 3/2013 | Niemela |

OTHER PUBLICATIONS

ListCWall Source, http://www.bleepingcomputer.com/download/listcwall/, downloaded circa Jan. 8, 2015, pp. 1-1.

\* cited by examiner

ANTI-RANSOMWARE

PRIORITY CLAIM

The instant patent application is related to and claims priority from co-pending India Application entitled, "ANTI-RANSOMWARE", Application Number: 2461/MUM/2015, filed on: 26 Jun. 2015, First Named Inventor: AISHWARY BHASHKAR, which is incorporated in its entirety herewith.

BACKGROUND OF THE DISCLOSURE

Technical Field

The present disclosure relates generally to malicious software detection systems, and more specifically to anti-ransomware.

Related Art

Malicious applications are designed specifically to damage or disrupt the operation of a system, as is well known in the relevant arts. Ransomware is a type of malicious software, which targets files storing personal information (such as passwords, identity information, and financial information). A ransomware application identifies such files and then makes the data unavailable for viewing by users, for example, by encrypting the data. The user is required to make a payment before being able to view or recover the data (personal information).

Anti-ransomware refers to solutions designed to address the maladies of such ransomware application.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
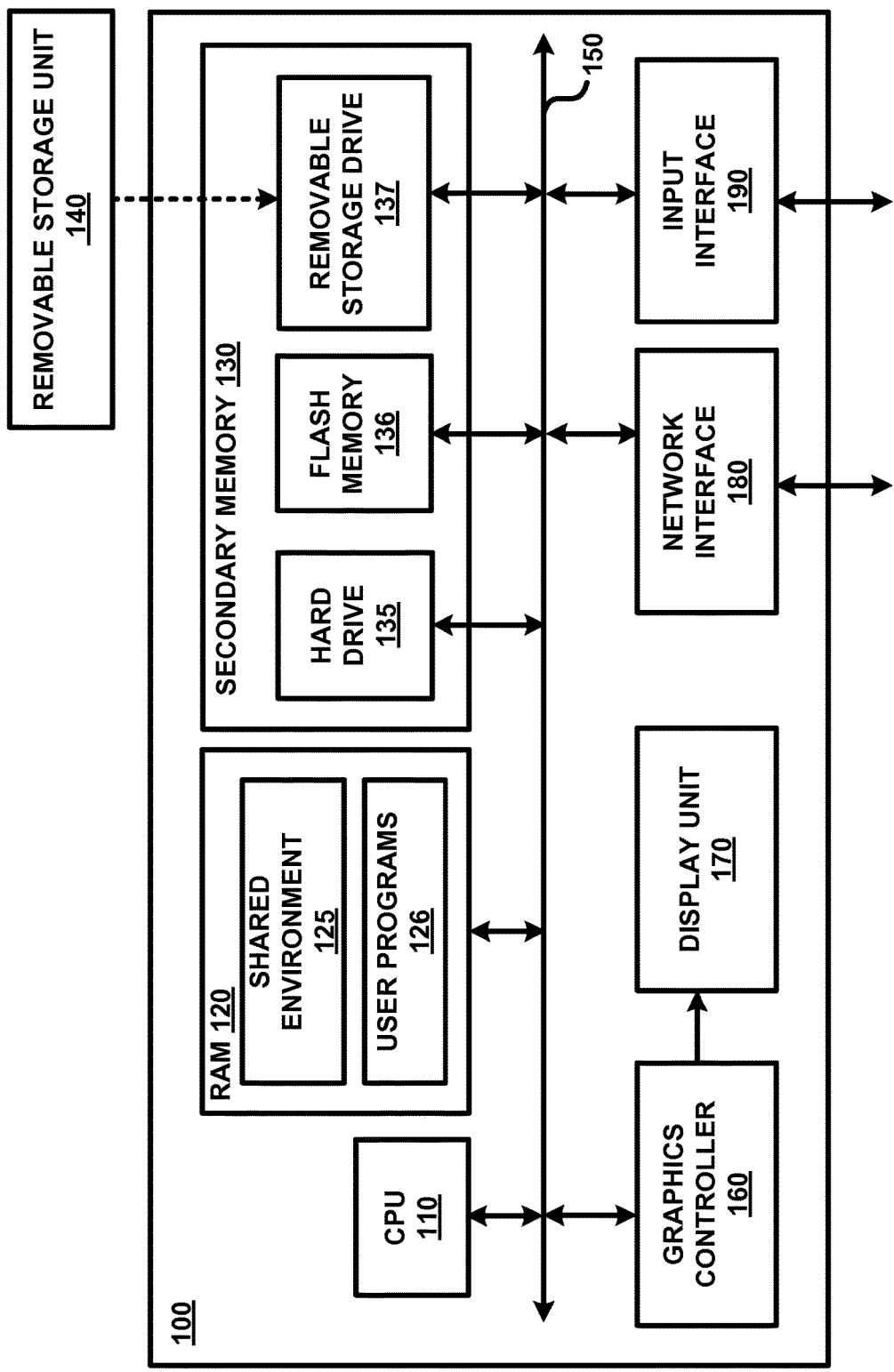
FIG. 1 is a block diagram illustrating the details of a digital processing system in which various aspects of the present disclosure are operative by execution of appropriate executable modules.

According to an aspect of the present disclosure, a digital processing system, in response to identifying multiple files opened with write permission by a process, creates a corresponding backup copy of each of the opened files. The system computes a frequency of opening of the files with write permission by the process, and then determines whether the computed frequency is greater than a threshold. If the frequency is determined to be greater than the threshold, the system provides control to a user to recover any of the files (opened by the process) based on the corresponding backup copy (previously created in response to opening).

Thus, the operation of a ransomware in the system may be potentially detected and the associated maladies (such as unavailability of personal data, requirement to make payment for recovering the personal data, etc.) may be avoided.

According to another aspect of the present disclosure, the multiple files opened by a process are according to a sequence. As such, in response to identifying of opening of a first file in the sequence, a digital processing system creates a snapshot of a storage volume containing the first file. Accordingly, the system enables a user to recover any of the files based on either the corresponding backup copy or the snapshot.

According to one more aspect of the present disclosure, the threshold is specified as a first number for a first duration, with the computing of the frequency of opening files being performed in response to opening each batch of the first number of files in a sequence (of opening of files by a process). The computing of each batch is performed by calculating a second duration between opening of a first file and a last file in the batch according to the sequence. A digital processing system then determines that the frequency is greater than the threshold if the calculated second duration is less than the first duration specified in the threshold.

According to yet another aspect of the present disclosure, when the frequency of opening files (with write permission) by a process is determined to be greater than the threshold, a digital processing system displays a message to a user enquiring whether the process is a suspicious process (that is, a ransomware software), and receives (from the user) a response indicating whether or not the process is a suspicious process. If the response indicates that the process is a suspicious process, the user is facilitated to perform the recovery of the files (opened by the process). If the response indicates that the process is not a suspicious process, the system purges the corresponding backup copy of each of files opened by the process.

According to an aspect of the present disclosure, a digital processing system maintains a whitelist of processes indicated to be not suspicious processes (that is, not ransomware software), for example, by a user of the system. In response to opening of a file with write permission by a process, the system checks whether the process is included in the whitelist, and then performs the above noted actions of identifying, creating, computing, determining and providing control only if checking determines that the process is not included in the whitelist.

According to another aspect of the present disclosure, a digital processing system receives an indication that a process has terminated, and in response to the indication, purges the corresponding backup copy (previously created) of files opened with write permission by the process.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Digital Processing System

FIG. 1 is a block diagram illustrating the details of digital processing system 100 in which various aspects of the present disclosure are operative by execution of appropriate executable modules. Digital processing system 100 may contain one or more processors such as a central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The blocks of FIG. 1 are described below in further detail.

CPU 110 may execute instructions stored in RAM 120 to provide several features of the present disclosure. CPU 110 may contain multiple processing units, with each processing unit potentially being designed for a specific task. Alternatively, CPU 110 may contain only a single general-purpose processing unit. RAM 120 may receive instructions from secondary memory 130 using communication path 150. RAM 120 is shown currently containing software instructions constituting shared environment 125 and user programs 126. Shared environment 125 includes operating systems, device drivers, virtual machines, etc., which provide a (common) run time environment for execution of user programs 126.

User programs 126 may include one or more application processes (hereafter "processes"). As is well known, a process is an instance of a software program that is loading in RAM 120 and being currently executed by CPU 110. Multiple processes may be present in RAM 120 simultaneously, with the processes being concurrently executed by multiple processing units of CPU 110, or using techniques such as time-sharing using a single processing unit as is well known in the relevant arts. During execution, the process may access data maintained in RAM 120 or in storage memory 130.

The execution of a process may be terminated based on execution of instructions such as Halt/stop in machine language or (machine instructions corresponding to) exit in higher level languages. Process terminations can occur due to error conditions associated with software and/or hardware as well, as is well known in the relevant arts.

It may be appreciated that a process may also be an instance of a ransomware software. A well-known ransomware software is "CryptoLocker" which generates and uploads a 2048-bit RSA (Ron Rivest, Adi Shamir and Leonard Adleman) key pair to a command-and-control server. The ransomware then identifies files using a list of specific file extensions and then encrypts the files using the public key of the key pair. The ransomware then threatens to delete the private key if a payment is not made within a deadline. Even after the deadline is passed, the private key is still obtainable, though at a higher price. Due to the extremely large key size the ransomware uses, it is considered to be extremely difficult to repair/recover from a "CryptoLocker" attack.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and a pointing device (e.g., touch-pad, mouse) and may be used to provide inputs. Network interface 180 provides connectivity to a network and may be used to communicate with other systems connected to the network.

Secondary memory 130 may contain hard drive 135, flash memory 136, and removable storage drive 137. Secondary memory 130 may store the data (such as process whitelist, frequency counters, etc, provided according to several aspects of the present disclosure) and software instructions (for implementing the steps of FIG. 2, described below), which enable digital processing system 100 to provide several features in accordance with the present disclosure. The code/instructions stored in secondary memory 130 may either be copied to RAM 120 prior to execution by CPU 110 for higher execution speeds, or may be directly executed by CPU 110.

Some or all of the data and instructions may be provided on removable storage unit 140, and the data and instructions may be read and provided by removable storage drive 137 to CPU 110. Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 130. Volatile media includes dynamic memory, such as RAM 120. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 150. Transmission media can also take the form of acoustic or light waves, such as those generated during radio-wave and infra-red data communications.

In one embodiment, secondary memory 130 (in particular, the storage media therein) implements a file system providing storage and retrieval of data in the form of files organized as one or more directories, as is well known in the relevant arts. Some of the files (hereafter "personal files") may be used by users of digital processing system 100 to store their personal information. Such personal files may become potential targets of processes (instance of ransomware software) executing in digital processing system 100.

The manner in which CPU 110 provides various anti-ransomware features (in particular, to address the maladies of ransomware software) is described below with examples.

3. Providing Anti-Ransomware

Figure 2:
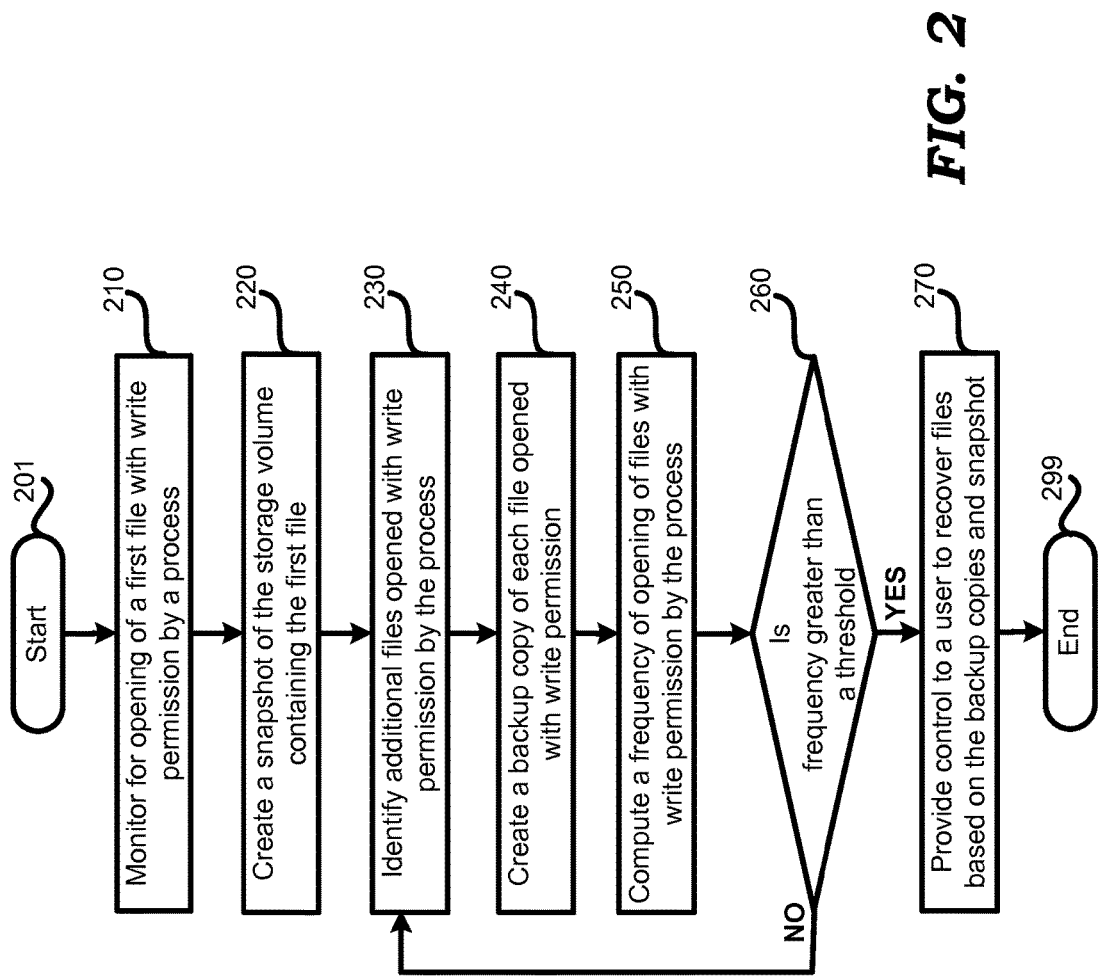
FIG. 2 is a flow chart illustrating the manner in an anti-ransomware software is operative in one embodiment.

FIG. 2 is a flow chart illustrating the manner in which an anti-ransomware is provided according to an aspect of the present disclosure. The flowchart is described with respect to the blocks of FIG. 1, and with respect to CPU 110 in particular, merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, CPU 110 monitors for opening of a first file (maintained in secondary memory 130) with write permission by a process (loaded in RAM 120 and currently being executed). Opening of a file with write permission implies that the process is thereafter permitted to write data into the first file. Without write permission associated with a file, a process is not allowed to write data into the file.

In step 220, CPU 110 creates a snapshot of the storage volume containing the first file. The snapshot represents the data stored in the storage volume at the point of creation of the snapshot, i.e., upon opening of the first file of step 210. As is well known, when multiple processes open the respective first files in the same storage volume, the snapshot for the first process may be entire data stored on the storage volume, but snapshots for subsequent processes may contain only incremental data (i.e., those changes from the previous snapshot).

In step 230, CPU 110 identifies additional files opened with write permission by the process (that opened the first file). The identification may be performed similar to step 210.

In step 240, CPU 110 creates a backup copy of each file opened with write permission. A backup copy implies that the data contained in a file (sought to be opened) is duplicated to another file in the file system, typically to a location different from the location of the (original) file. It may be appreciated that after the creation of the backup copy, the process is provided access to the file, thereby enabling the process to write data to the file.

In step 250, CPU 110 computes a frequency of opening of files with write permission by the (same) process. The frequency can be computed in terms of (a second) number of files opened for a pre-determined duration (e.g. 1 second).

In step 260, CPU 110 determines whether the computed frequency is greater than a threshold. The threshold may be received from a user or specified as part of a configuration data. The threshold may indicate another/first number of files that are generally opened during normal operation (of digital processing system 100) for the same pre-determined duration noted above. Accordingly, the computed frequency being greater than the threshold indicates that the process may be an instance of ransomware software. Control passes to step 230 if the frequency is determined to be less than the threshold, wherein CPU 110 continues to monitor (and identify) additional files opened with write permission by the (same) process. Control passes to step 270 of the frequency is determined to be greater than the threshold (potential ransomware).

In step 270, CPU 110 provides control to a user to recover files based on the backup copies and snapshot created in steps 240 and 220 respectively. In one embodiment, such control is provided only upon the user indicating that the process is a suspicious process (as a response to a message displayed to the user upon determining that the computed frequency is greater than the threshold). The flow chart ends in step 299.

Thus, the execution of a ransomware in the system may be potentially detected and the associated maladies (such as unavailability of personal data, requirement to make payment for recovering the personal data, etc.) may be avoided. The manner in which an anti-ransomware software may be operative according to FIG. 2 is illustrated below with examples.

4. Illustrative Example

Figure 3:
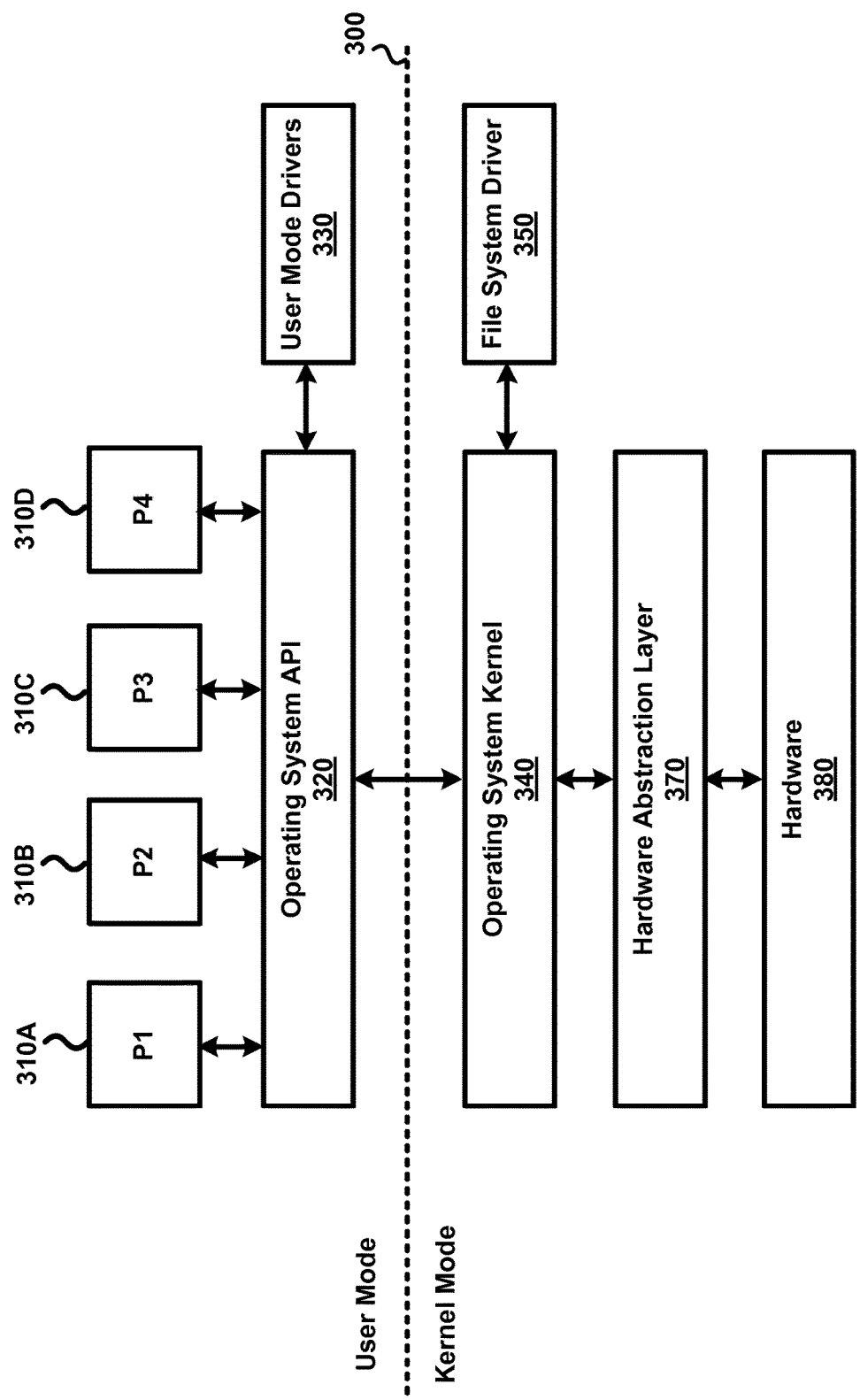
FIG. 3 depicts an example implementation of an anti-ransomware software.
Figure 4:
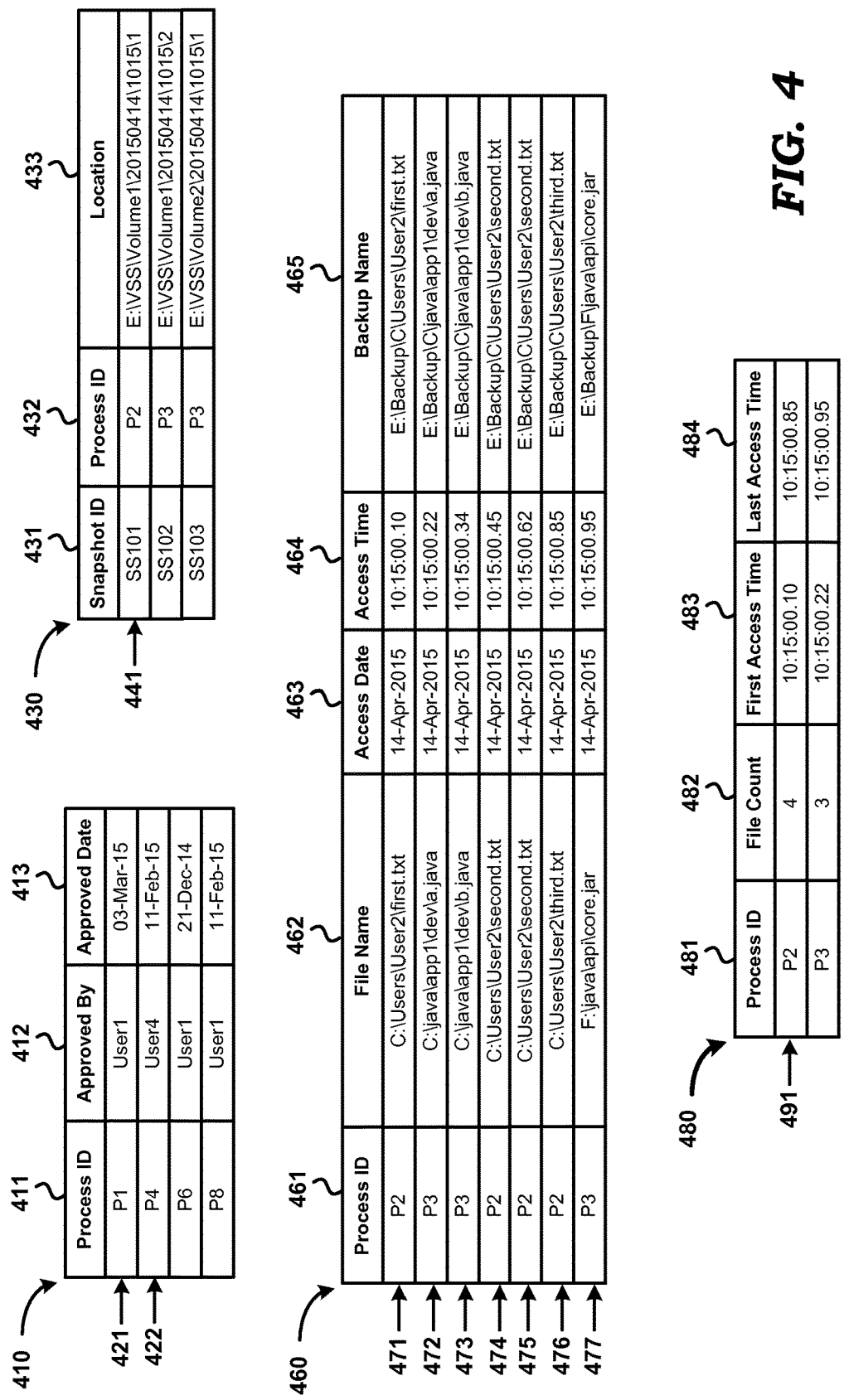
FIG. 4 depicts various data structures used in the detection of ransomware in one embodiment.

FIGS. 3 and 4 together illustrate the manner in which an anti-ransomware software is provided in one embodiment. Each of the Figures is described in detail below.

FIG. 3 is a block diagram illustrating the logical view of the internals of digital processing system (100) in one embodiment. The block diagram is shown containing processes 310A-31D (respectively named "P1" to "P4"), operating system application program interface (API) 320, user mode drivers 330, operating system kernel 340, file system driver 350, hardware abstraction layer 370 and hardware 380.

Broadly, CPU 110 operates in two different modes—a user mode and a kernel mode (as indicated by the dotted line 300). CPU 110 switches between the two modes depending on what type of code/process is currently being executing by CPU 110. In general, applications/processes (and some drivers) are executed in user mode, while core operating system components and low level software drivers run in kernel mode. Thus, process 310A-310D, operating system API 320 and user mode drivers 330 are shown executing in user mode (above line 300), while operating system kernel 340, file system driver 350, hardware abstraction layer 370 are shown executing in kernel mode (below line 300).

Each of process 310A-310D represents a corresponding instance of a software program (including ransomware software) executing in digital processing system 100. Operating system API 320 represents a software program (executing in memory as part of shared environment 125) that provides various interfaces (routines, protocols, etc.) for performing various tasks associated with the operating system such as accessing files, sending/receiving data over a network, displaying a graphical user interface (GUI), receiving inputs specified in a GUI, etc. Each of processes 310A-310D invokes appropriate interfaces exposed by operating system API 320 for performing the desired tasks. User mode drivers 330 represent softwares that directly interface with hardware components in user mode. Examples of such user mode drivers 330 are printer drivers, driver based on User Mode Driver Framework, etc. Operating system API 320 may invoke some of user mode drivers 330 for performing some of the tasks (for example, printing a document).

Operating system kernel 340 represents a program/process that manages hardware input/output (I/O) requests from other software applications executing in digital processing system 100. In general, operating system kernel 340 translates the received I/O requests into data processing instructions for CPU 110 and other processing components present in digital processing system 100. The I/O requests may be received from operating system API 320 during the performance of various tasks requested by processes 310A-310D.

Hardware abstraction layer 370 provides a set of standard calls to the hardware, thereby enabling higher layers (such as operating system kernel 340) to be implemented without having to write instructions specific to the components in hardware 380. Hardware abstraction layer 370 may translate the standard calls to machine level instructions appropriate to the components in hardware 380. For example, hardware abstraction layer 370 may provide a common/single CPU instruction set, while translating the instructions specified in the common set to the specific instruction set required for the type of CPU contained in hardware 380. Hardware 380 includes various hardware components contained in digital process system 100 such as CPU 110, RAM 120, secondary memory 130, display unit 170, network interface 180, input interface 190, etc.

File system driver 350 represents a software that facilitates other programs/processes to store/retrieve data in secondary memory 130 as files/directories (i.e., a file system). All requests that are directed to the file system are sent to file system driver 350, which in turn translates the received requests into corresponding one or more I/O requests that are then processed by operating system kernel 340. It may be appreciated that though shown external to operating system kernel 340, in alternative embodiments, file system driver 350 may be provided integrated into operating system kernel 340.

File system driver 350, extended according to several aspects of the present disclosure, facilitates identification of whether processes 310A-310D corresponds to an instance of a ransomware software, and to remedy (recover) any maladies created by such processes. The manner in which file system driver 350 operates as an anti-ransomware is described below with examples.

5. File System Driver

FIG. 4 illustrates the various data structures that are maintained (by file system driver 350) for providing an anti-ransomware in one embodiment. For illustration, each data structure is shown in the form of a corresponding table (having rows and columns) However, in alternative embodiments, the data described below may be maintained in other formats such as Extensible Markup Language (XML) and/or other data structures such as lists, trees, etc. as will be apparent to one skilled in the relevant arts by reading the disclosure herein.

Table 410 depicts a portion of a whitelist (of processes) maintained by file system driver 350. Column 411 ("Process ID") specifies a unique identifier (such as P1, P2, etc.) of the process, column 412 ("Approved By") specifies the name (such as "User1", "User2", etc.) of the user who approved the process to be included in the whitelist, and column 413 ("Approved Date") specifies the date on which the user approved the process for inclusion in the whitelist.

Each of the rows of table 410 specifies a corresponding process that is included in the whitelist. It may be observed that rows 421 and 422 respectively indicate that process P1 (310A) and P4 (310D) are included in the whitelist. In particular, row 421 indicates that the process P1 was approved for inclusion into the whitelist by "User1" on "03-Mar-15". Similarly, other rows specify the details of other processes included in the whitelist.

According to an aspect of the present disclosure, file system driver 350, in response to opening of a file with write permission by a process (such as P1-P4), checks whether the process is included in the whitelist. In the scenario that the file is opened by process P1 or P4 (included in the whitelist of table 410), no actions (for addressing ransomware) in accordance with FIG. 2 are performed. However, file system driver 350 continues to facilitate the processes to perform various file operations such as creating, updating, deleting, changing access flags, moving, copying, of files/directories, etc. as will be readily apparent to one skilled in the relevant arts.

In the scenario that the file is opened with write permission is by process P2 or P3 (not contained in the whitelist of table 410), file system driver 350 starts monitoring of files opened with write permission by such processes. The description is continued assuming that the file is being opened with write permission by process P2.

After determining that process P2 is not included in the whitelist, file system driver 350 also determines that the file is the first file sought to be opened by process P2. According to an aspect of the present disclosure, file system driver 350 creates a snapshot of the storage volume containing the file if the file being opened is the first (in ordinal numbers) in the sequence of files opened by process P2. In one embodiment where the operating system is Windows™ available from Microsoft Corporation™, file system driver 350 may use Volume Shadow Copy Service (VSS) available as part of Windows to create a snapshot of the storage volume. File system driver 350 may also maintain a snapshot data as described below with examples.

Table 430 depicts a portion of snapshot data maintained by file system driver 350. Column 431 ("Snapshot ID") specifies a unique identifier (such as SS101, SS102, etc.) of the snapshot, column 432 ("Process ID") specifies the process for which the snapshot has been created, and column 433 ("Location") specifies the location/path in the file system where the snapshot data has been created.

Each of the rows of table 430 specifies a corresponding snapshot created by file system driver 350. In particular, row 441 indicates that the snapshot identified by the unique identifier "SS101" has been created for process P2 (when the process opened a first file with write permission) at the location/path "E: \ VSS \ Volume1 \ 20150414 \ 10:15 \ 1". Similarly, other rows specify the details of other snapshots created by file system driver 350. It may be appreciated that snapshot SS102 (in row 442) may be an incremental snapshot compared to snapshot SS101 in row 441 since both the snapshots are of the same storage volume (Volume 1). It may be further appreciated that each storage volume corresponds to physical or logical drives (C:, D:, etc., in Windows File System) provided in the secondary storage.

After creating the snapshot using VSS and storing the snapshot information in table 430, file system driver 350 continues to identify the files opened with write permission by process P2 and creates a backup copy of each of the identified files. File system driver 350 may accordingly maintain a file access/backup data as described below with examples.

Table 460 depicts a portion of file access/backup data maintained by file system driver 350. Column 461 ("Process ID") specifies the unique identifier of the process opening the file, column 462 ("File Name") specifies the name (including the location/path) of the file opened with write permission by the process, columns 463 ("Access Date") and 464 ("Access Time") respectively specify the date and time at which the file is opened/accessed, and column 465 ("Backup Name") specifies the name (including the location/path) of the backup file corresponding to the file opened.

Each of the rows of table 460 specifies the details of a corresponding file opened by various non-whitelisted processes such as P2 and P3 in digital processing system 100. In particular, row 471 indicates that the process P2 is opening with write permission the file named "C:\Users\User2\first.txt" on 14 Apr. 2015 at "10:15:00.00"

(that is at 10:15 AM, 0 seconds, 0 hundredth of a second), for which a backup copy has been created as "E:\Backup\C\Users\User2\first.txt". Similarly, other rows specify the details of other files opened by other processes in digital processing system 100.

It may be observed that rows 471 and 474-476 specify the details/sequence of files opened by process P2, while rows 472-473 and 477 specify the details/sequence of files opened by process P3. It may be further observed that in response to the opening of the first file in a sequence, file system driver 350 cerate both a snapshot data (row 441) and a backup copy of the file (row 471).

Thus, file system driver 350 creates backup copies of the files opened with write permission by each of processes P2 and P3. It may be appreciated that after creating a backup copy, file system driver 350 may perform various file operations (such as those noted above) based on the requests received from the processes P2 and P3.

File system driver 350 also computes a frequency of opening of files with write permission by each process (such as P2) and compares the frequency with a threshold. In one embodiment, the threshold is specified as a first number for a first duration, with the computing of the frequency of opening files being performed in response to opening each batch of a first number of files in a sequence (of opening of files by a process). For example, the threshold may be specified as 5 files in 1 second, with the computing of the frequency being performed after the opening of each batch of 5 files.

It may be appreciated that the determination of a batch of files may be performed in any convenient manner. For example, assuming that the files in the sequence are numbered 1, 2, 3, etc., the batches may be viewed as 1-5, 6-10, 11-15, etc. with the computing being performed at the opening of the 5th, 10th, 15th, etc. file in the sequence (that is for each file that is a multiple of the number specified in the threshold). Alternatively, the batches may be viewed as 1-5, 2-6, 3-7, etc. with the computing being performed at the opening of the 5th, 6th, 7th, etc. file in the sequence (that is at each file after the number specified in the threshold).

To identify the batch and to compute the frequency thereafter, file system driver 350 maintains a frequency data as described below with examples.

Table 480 depicts a portion of frequency data maintained by file system driver 350. Column 481 ("Process ID") specifies the unique identifier of the process opening the file, column 482 ("File Count") specifies the number of files opened with write permission by the process, and columns 483 ("First Access Time") and 484 ("Last Access Time") specify the respective access times at which the first file and the last file is opened by the process. In other words, the file count indicates the number of files opened by the process between the first and last access times. For illustration, only the access times are shown in table 480, though in alternative embodiments, the first and last access dates may also be maintained along with the times in table 480.

Each of the rows of table 480 specifies the count of files opened by a process such as P2 and P3 in digital processing system 100. In particular, row 491 indicates that the process P2 has opened 4 files between the "10:15:00.10" and "10:15:00.85". Similarly, other rows specify the frequency of files opened by other processes in digital processing system 100. It should be noted that the columns/values in tables 460 and 480 are updated by file system driver 350 after the opening of each file by the corresponding process (P2 or P3 in this example).

It may be appreciated that in response to the opening of a next file by process P2, file system driver 350 updates in row 491, file count (482) to 5 and the last access time (484) to the time at the next file is opened. File system driver 350 then identifies that the file count 5 is equal to the number of files (5) specified in the threshold, and accordingly calculates a second duration between the last access time and the first access time. File system driver 350 then determines that the frequency is greater than the threshold (5 files per second) if the calculated second duration is less than the duration (1 second) specified in the threshold.

For example, if the next file is opened at "10:15:01.05", file system driver 350 calculates that the second duration is "10:15:01.05"-"10:15:00.10"="0.95" seconds, which is less than "1" second and accordingly determines the frequency of opening files by process P2 to be greater than the threshold. On the other hand, if the next file is opened at "10:15:01.20", file system driver 350 calculates the second duration to be "1.10" seconds which is greater than "1" second and accordingly determines the frequency of opening files by process P2 to be not greater (that is, less) than the threshold. In the scenario that the frequency is less than the threshold, file system driver 350 may continue to monitor the files opened by process P2 to identify the next batch of files. File system driver 350 may also reset (to zero or null) the values in columns 482-484 prior to identifying the next batch of files.

In the scenario that the frequency is determined to be greater than the threshold, file system driver 350 provides control to a user using digital processing system 100. In one embodiment, file system driver 350 blocks the process (P2) from opening the next file (that caused file count to be equal to the number of files specified in the threshold), and then displays a message (in the form of a pop-up window) to the user. For example, the pop-up window may have the message "<process name> is blocked due to suspicious activity." (where <process name> is replaced with the user comprehensible name of process P2) along with "Unblock" and "Continue" buttons.

The user may click/select the "Unblock" button to indicate that the process (P2) is not a suspicious process. In response, file system driver 350 purges/removes the corresponding backup copy of each of the files opened by the process P2 (along with removing the corresponding rows in file access data of table 460). File system driver 350 may also purge/remove the snapshots created for the process P2 along with removing the rows in the snapshot data of table 430. In one embodiment, in response to clicking/selecting the "Unblock" button, file system driver 350 adds the process P2 to the whitelist of table 410 (as another row in the table), thereby ensuring that the files opened by process P2 is thereafter not monitored by file system driver 350.

The user may also click/select the "Continue" button to indicate that process (P2) is to be continued to be blocked (in other words, process P2 is a suspicious process, possibly an instance of a ransomware software). In response, file system driver 350 may provide appropriate user interfaces (not shown) that enable the user to recover any of the files (such as those indicated in column 462 of rows 471 and 474-476) opened by process P2 using the corresponding backup copies of the files (column 465 of rows 471 and 474-476) and the snapshot (row 441) created earlier.

For example, the user may identify that the file named "first.txt" (row 471) has been encrypted by process P2 (since P2 is an instance of a ransomware software), and accordingly overwrite the encrypted file with the backup copy of the file. Accordingly, any personal information stored in the file "first.txt" is recovered by the user, without requiring any payment to be made. Thus, the execution of a ransomware is potentially detected and the associated maladies (such as unavailability of personal data, requirement to make payment for recovering the personal data, etc.) are avoided.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

6. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A computer implemented method comprising:
   identifying a plurality of files opened with write permission, but not with read permission, by a process;
   creating, in response to said identifying, a corresponding backup copy of each of said plurality of files opened with write permission, but not with read permission, by said process;
   computing a frequency of opening with write permission, but not with read permission, of said plurality of files by said process;
   determining whether said frequency is greater than a threshold; and
   if said frequency is determined to be greater than said threshold, providing control to a user to recover any of said plurality of files based on said corresponding backup copy.

2. The computer implemented method of claim 1, wherein said providing control comprises:
   displaying, when said frequency is determined to be greater than said threshold, a message enquiring whether said process is a suspicious process;
   receiving from said user, a response indicating whether or not said process is a suspicious process;
   facilitating said user to perform said recovery if said response indicates that said process is a suspicious process; and
   purging said corresponding backup copy of each of said plurality of files, if said response indicates that said process is not said suspicious process.

3. The computer implemented method of claim 2, wherein said suspicious process corresponds to a ransomware software.

4. The computer implemented method of claim 2, further comprising:
   maintaining a whitelist of processes including processes indicated not to be suspicious;
   checking, in response to opening of a file with write permission, whether said process is included in said whitelist,
   wherein said identifying, said creating, said computing, said determining and said providing are performed only if said checking determines that said process is not included in said whitelist.

5. The computer implemented method of claim 1, further comprising:
   receiving an indication that said process has stopped execution; and
   purging said corresponding backup copy of each of said plurality of files, in response to said receiving of said indication.

6. The computer implemented method of claim 1, wherein said identifying, said creating, said computing, said determining and said providing are not performed for files opened with read permission,
   wherein said creating is performed for each file of said plurality of files prior to any data being written to the corresponding file requested to be opened with write permission.

7. The computer implemented method of claim 6, wherein said plurality of files is opened according to a sequence, said method further comprising:
   in response to said identifying of opening of a first file of said plurality of files in said sequence, creating a snapshot of a storage volume containing said first file,
   wherein said user is enabled to recover any of said plurality of files based on either said corresponding backup copy or said snapshot.

8. The computer implemented method of claim 7, wherein said threshold is specified as a first number for a first duration,
   wherein said computing is performed in response to opening each batch of said first number of files in said sequence, wherein said computing for each batch comprises:
   calculating a second duration between opening of a first file and a last file in the batch according to said sequence,
   wherein said determining determines that said frequency is greater than said threshold if said second duration is less than said first duration.

9. A non-transitory machine readable medium storing one or more sequences of instructions for enabling a digital processing system to facilitate users to recover from ransomware, a wherein execution of said one or more instructions by one or more processors contained in said digital processing system enables said digital processing system to perform the actions of:
   identifying a plurality of files stored on a first storage that are opened with write permission, but not with read permission, by a process;

creating, in response to said identifying, a corresponding backup copy of each of said plurality of files opened with write permission, but not with read permission, by said process;

computing a frequency of opening with write permission, but not with read permission, of said plurality of files by said process;

determining whether said frequency is greater than a threshold; and if said frequency is determined to be greater than said threshold, providing control to a user to recover any of said plurality of files based on said corresponding backup copy, wherein recovering a file of said plurality of files entails overwriting the file stored in said first storage with the corresponding backup copy of the file.

10. The non-transitory machine readable medium of claim 9, wherein said plurality of files is opened according to a sequence, further comprising one or more instructions for:

in response to said identifying of opening of a first file of said plurality of files in said sequence, creating a snapshot of a storage volume containing said first file, wherein said user is enabled to recover any of said plurality of files based on either said corresponding backup copy or said snapshot.

11. The non-transitory machine readable medium of claim 10, wherein said threshold is specified as a first number for a first duration, wherein said computing is performed in response to opening each batch of said first number of files in said sequence, wherein said computing for each batch comprises one or more instructions for:

calculating a second duration between opening of a first file and a last file in the batch according to said sequence, wherein said determining determines that said frequency is greater than said threshold if said second duration is less than said first duration.

12. The non-transitory machine readable medium of claim 9, wherein said providing control comprises one or more instructions for:

displaying, when said frequency is determined to be greater than said threshold, a message enquiring whether said process is a suspicious process;

receiving from said user, a response indicating whether or not said process is said suspicious process;

facilitating said user to perform said recovery if said response indicates that said process is said suspicious process; and purging said corresponding backup copy of each of said plurality of files, if said response indicates that said process is not said suspicious process.

13. The non-transitory machine readable medium of claim 12, wherein said suspicious process corresponds to a ransomware software.

14. The non-transitory machine readable medium of claim 9, further comprising one or more instructions for:

maintaining a whitelist of processes;

checking, in response to opening of a file with write permission, whether said process is included in said whitelist, wherein said identifying, said creating, said computing, said determining and said providing are performed only if said checking determines that said process is not included in said whitelist.

15. The non-transitory machine readable medium of claim 9, further comprising one or more instructions for:

receiving an indication that said process has stopped execution; and purging said corresponding backup copy of each of said plurality of files, in response to said receiving of said indication.

16. A digital processing system comprising:

a processor;

a random access memory (RAM);

a machine readable medium to store one or more instructions, which when retrieved into said RAM and executed by said processor causes said digital processing system to perform the actions of:

identifying a plurality of files opened with write permission, but not with read permission, by a process;

creating, in response to said identifying, a corresponding backup copy of each of said plurality of files opened with write permission, but not with read permission, by said process;

computing a frequency of opening with write permission, but not with read permission, of said plurality of files by said process;

determining whether said frequency is greater than a threshold; and if said frequency is determined to be greater than said threshold, providing control to a user to recover any of said plurality of files based on said corresponding backup copy.

17. The digital processing system of claim 16, wherein said plurality of files is opened according to a sequence, said digital processing system further performing the actions of:

in response to said identifying of opening of a first file of said plurality of files in said sequence, creating a snapshot of a storage volume containing said first file, wherein said user is enabled to recover any of said plurality of files based on either said corresponding backup copy or said snapshot.

18. The digital processing system of claim 17, wherein said threshold is specified as a first number for a first duration, wherein said computing is performed in response to opening each batch of said first number of files in said sequence, wherein for said computing for each batch, said digital processing system performs the actions of:

calculating a second duration between opening of a first file and a last file in the batch according to said sequence, wherein said determining determines that said frequency is greater than said threshold if said second duration is less than said first duration.

19. The digital processing system of claim 16, wherein for said providing control, said digital processing system performs the actions of:

displaying, when said frequency is determined to be greater than said threshold, a message enquiring whether said process is a suspicious process;

receiving from said user, a response indicating whether or not said process is said suspicious process;

facilitating said user to perform said recovery if said response indicates that said process is said suspicious process; and purging said corresponding backup copy of each of said plurality of files, if said response indicates that said process is not said suspicious process, wherein said suspicious process corresponds to a ransomware software.

20. The digital processing system of claim 16, further performing the actions of:

maintaining a whitelist of processes;
checking, in response to opening of a file with write permission, whether said process is included in said whitelist,
wherein said digital processing system performs said identifying, said creating, said computing, said determining and said providing only if said checking determines that said process is not included in said whitelist.

* * * * *